United States Patent Office 2,886,815
Patented May 19, 1959

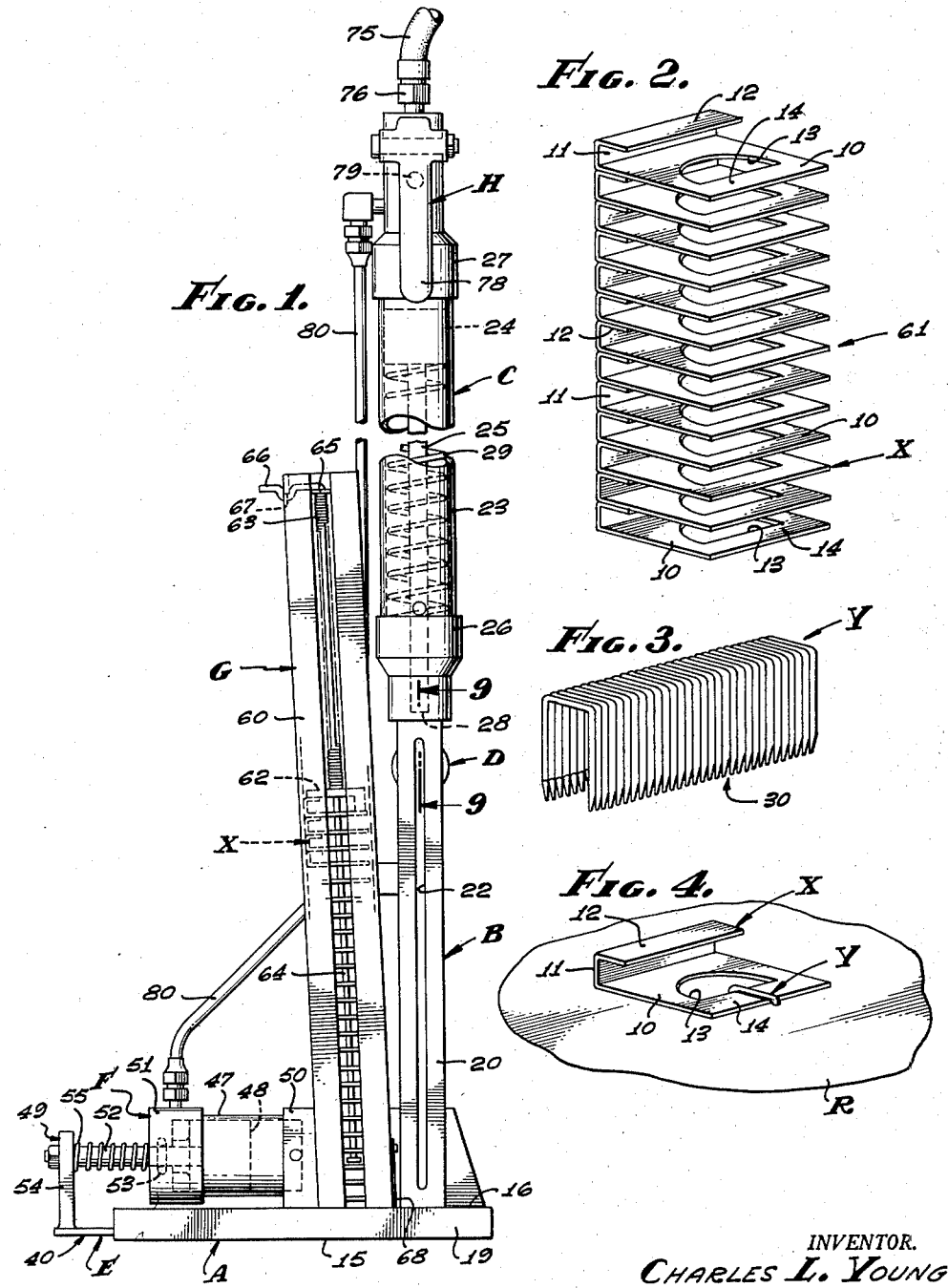

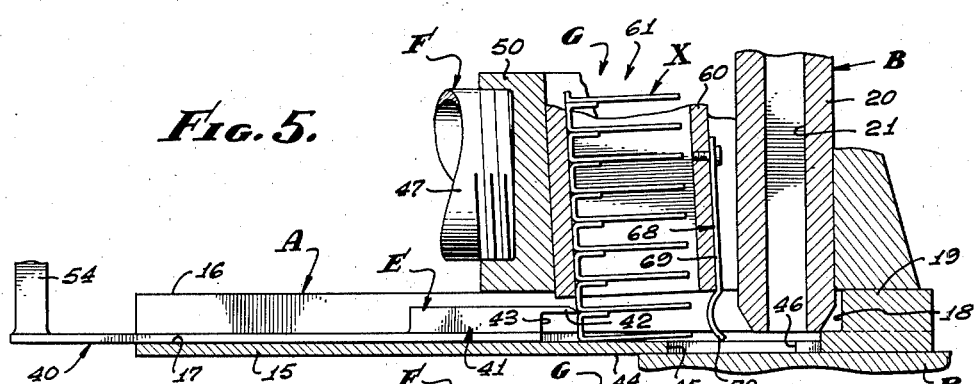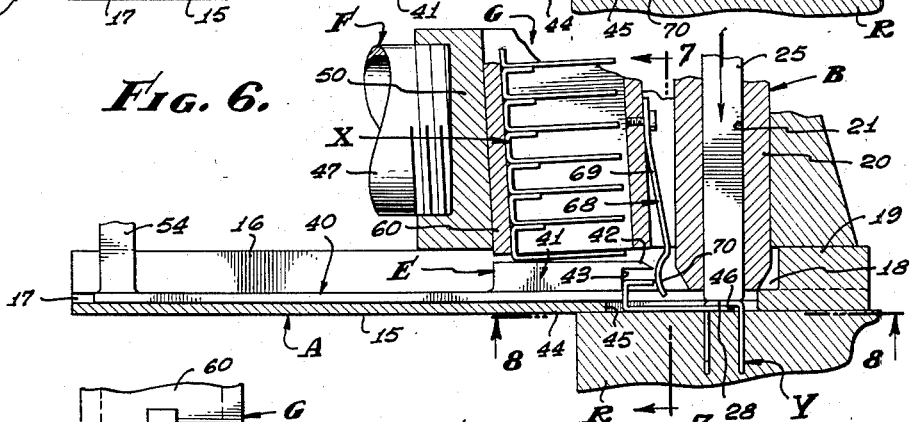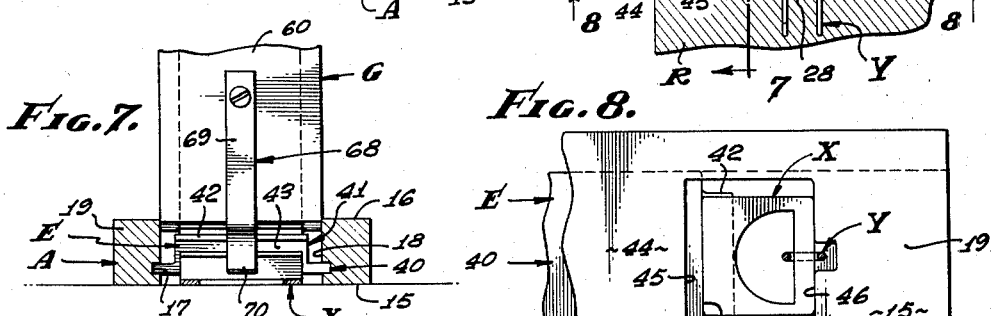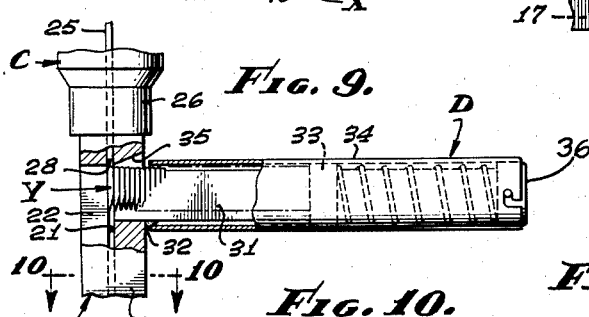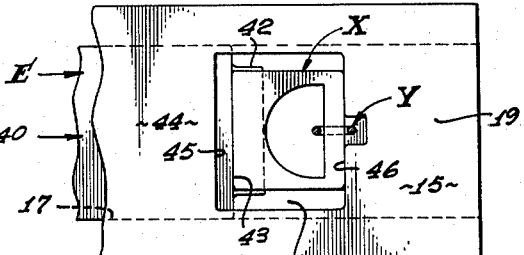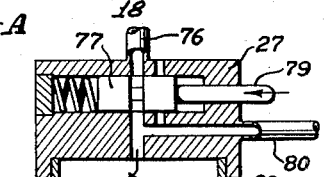

2,886,815

CLIP APPLICATING GUN

Charles L. Young, Lawndale, Calif., assignor to Powers Wire Products Company, Monterey Park, Calif., a corporation of California Application December 13, 1954, Serial No. 474,686

6 Claims. (Cl. 1—44.4)

This invention relates to a clip applicating gun and is particularly concerned with the securing of a spring clip to a support therefor by means of a fastener, such as a nail, pin or staple, or the like.

In the manufacture of furniture and the like, it is common to employ clips that act to secure and anchor the ends of springs, and wire staples are employed in order to secure the clips to the frame part of the furniture. Heretofore, the clips have been manually placed in the desired position and then U-shaped staples have been applied to the clips to secure them in place. Ordinary stapling guns have been employed for driving the staples, and though the installation of the clips is usually satisfactory the installation is subject to variations due to the manual step involved and is rather slow and time consuming. Further, if the stapling gun is not properly aligned with the clip, the clip and staple will become damaged and the gun, too, will suffer ill effects. Therefore, I have provided a structure that properly handles, feeds and drives both the clips and the fasteners or staples.

It is a general object of this invention to provide a gun that handles and feeds clips and staples and that drives the staples to secure the clips to a support. The gun that I have provided has magazines that handle both the clips and the staples, so that they are automatically related to each other and so that the clips are accurately fastened to the support.

An object of this invention is to provide a gun of the character referred to that relates a clip and a staple so that the clip can be positioned as desired and so that the staple is driven onto the clip to fasten or secure the clip to a support.

Another object of this invention is to provide a clip applicating gun of the character referred to with handling means for feeding clips into an exact position to then be secured in place. Means are provided to store and to advance the clips into position where they are secured in place on a support.

It is still another object of this invention to provide means for holding the clips firmly during transportation from the magazine to the position where they are secured in place on the support.

It is still another object of this invention to provide a simple, inexpensive gun of the character referred to that accurately positions and fastens clips in place upon a support and which is rapid and reliable in operation.

The various objects and features of my invention will be fully understood from the following detailed description of a typical preferred form and application of my invention, throughout which description reference is made to the accompanying drawings, in which:

Fig. 1 is an elevation of the clip applicating gun of the present invention. Fig. 2 is a perspective view of a stack of clips as they are supplied for use in the gun shown in Fig. 1. Fig. 3 is a perspective view of a stack of fasteners or staples as they are supplied for use in the gun shown in Fig. 1. Fig. 4 is a perspective view of the clip as it is applied to a support by the gun of the present invention. Fig. 5 is an enlarged detailed longitudinal sectional view of a portion of the gun shown in Fig. 1 of the drawings, and showing the parts thereof as they are related before the gun is operated. Fig. 6 is a view similar to Fig. 5 showing the parts of the gun after they have been operated to fasten the clip to a support. Fig. 7 is a sectional view taken as indicated by line 7—7 on Fig. 6. Fig. 8 is a view of the bottom of the gun taken as indicated by line 8—8 on Fig. 6. Fig. 9 is a view of a portion of the structure taken as indicated by line 9—9 on Fig. 1, and showing parts thereof in section. Fig. 10 is an enlarged sectional view taken as indicated by line 10—10 on Fig. 9, and Fig. 11 is a diagrammatic view of the type of control valve that is employed.

The clip applicating gun that I have provided is adapted to handle and feed clips X and staples Y and to relate the said clips and staples and to drive said staples onto the clips, thereby securing the clips in place as circumstances require. The invention involves, generally, a frame A, a staple handling means involving staple driveway means B carried by the frame, a staple driving means C, a staple supply D, a clip handling means involving a clip, feeding means E carried in the frame A, a drive F for the means E, a clip supply G and a control H for the driving means C and F.

In the particular form of the invention illustrated, a clip is handled that is adapted to anchor the end of springs and the like, and is a clip involving a flat base 10, an up-standing flange 11 at one side of the base, and an inwardly turned lip 12 projecting from the flange 11. The clip base 10, as clearly illustrated in Fig. 4, is formed of sheet material, such as steel or the like, and is flat and rectangular in plan configuration. In practice, the base 10 is substantially square and is characterized by having an opening 13 therein of substantial size. The opening 13 in the base 10 leaves a marginal bar 14 of material along one side, which I will refer to as the forward side of the clip X. The up-standing flange 11 projects upwardly from the rear side of the base 10 in a plane normal to the base, and the lip 12 projects inwardly from the upper part of the flange 11 to overlie the base 10 at the rear side thereof. The lip 12 is spaced from and is parallel to the base 10, and as shown, the bar 14 is at the forward side of the base 10, while the flange 11 and lip 12 are at the opposite or rear side of the flange of the base 10, leaving the opening 13 to occur therebetween.

In the particular form of the invention illustrated, a fastener or staple Y is handled, that is, adapted to be driven into substantially hard material to secure the clip X in working position. As shown, the staples Y are U-shaped and are formed of wire or the like, and have a pair of sharpened ends. The staples Y are elongate with straight parallel shanks joined by a straight crown. The shanks are spaced so that they readily straddle the bar 14 and so that the crown of the staple may be driven down and onto the bar 14 to securely hold the clip X in place. When the staple Y is driven to fasten the clip X in working position on a support, one leg of the staple is driven outside of the bar 14 while the other leg is driven inside the bar 14 through the opening 13.

The gun of the present invention is adapted to be manually operated so that it can be positioned as circumstances require and when in an upright position as shown in Fig. 1 of the drawings, and as described throughout this specification the gun may be used to apply and secure clips to a horizontal surface or support and, in which case, the frame A is horizontally disposed.

The frame A is an elongate part having a flat bottom 15 and a top 16. A guide passage 17 (Fig. 5) extends longitudinally through the frame A between the bottom 15 and top 16, and an opening 18 extends vertically through the frame A at the front end portion 19 thereof to intersect the guide passage 17. The vertical opening 18 is of substantial size and accommodates both the clips X and the staples Y. The guide passage 17 is preferably substantially equal in width to the clips X and, in practice, is of limited vertical extent.

The fastener or staple driveway means B (Fig. 9) is provided to guide the staples Y into proper and exact position relative to the clips X and involves a vertically disposed body 20 projecting upwardly from the end 19 of the frame A and with its lower end entering the opening 18. A driveway 21 extends vertically through the body 20 to open at the top and the bottom thereof. The driveway 21 is rectangular in cross section having parallel side walls with suitable clearance for directing the staples Y. An elongate vertical disposed slot 22 opens into the driveway 21 and to the exterior of the body 20, and is provided to gain access to the driveway 21 to clear staples from the guideway in case the staples become lodged or jammed therein. In accordance with the invention, the driveway 21 opens into the opening 18 on a line that intersects the longitudinal axis of the frame A so that the shanks of the staples Y each intersect the said axis of the frame when the staples are driven as hereinafter described.

The staple driving means C is preferably a powered means and, as shown in the drawings, is a fluid means involving a cylinder 23, a piston 24 and a plunger or driver 25. The cylinder 23 is carried by the upper end of the body 20 through a suitable fitting 26 and projects vertically upwardly therefrom, while a head 27 is provided to close the upper end of the cylinder 23. The piston 24 is slidably carried in the cylinder 23 and is adapted to operate between the upper and lower ends of the cylinder. The driver is connected to the piston 24 and is an elongate part rectangular in cross section, conforming in cross section to the driveway 21. The driver 25 depends from the piston 24 and enters the driveway 21. The lower end 28 of the driver 25 is adapted to cooperate with the crown of each staple Y, and when the piston 24 is up the end 28 is at the upper end portion of the driveway 21 as shown in Fig. 9. When the driver 25 is operated to drive a staple Y, the end 28 moves to the lower end of the body 20 to be substantially flush therewith, as shown in Fig. 6 of the drawings. A spring 29 acts between the fitting 26 and the piston 24 to lift the piston and driver to the up position after being operated to drive a staple Y.

The fastener or staple supply means D (Fig. 9) is in the form of a magazine adapted to receive a substantially large number of staples and, in accordance with common practice and as illustrated in Fig. 3 of the drawings, the staples Y handled by the gun are supplied in stacks or sticks 30. The stick 30 of staples is made up of a plurality of staples Y, which are arranged side by side one against the other in an elongate series. The stick 30 may be secured together by means of suitable cement. The supply means D is carried at the upper end portion of the body 20 and involves a guide 31 secured to the body 20 at 32 to project laterally therefrom, a spring biased follower 33 and a cover 34.

The guide 31 is an elongate part rectangular in cross section and proportioned to fit between the shanks of the staples Y and to support the bodies or heads thereof. The guide 31 enters an aperture 35 in the upper end portion of the body 20, which aperture opens into the driveway 21. The aperture 35 passes the staples Y with suitable clearance and the staples are guided by the guide 31 to the driveway 21. The follower 33 is slidably carried on the guide 31 and acts to yieldingly urge the staples into the driveway 21. The driveway 21 is of sufficient depth to receive one staple at a time so that the driver 25 picks up but one staple Y as it moves downwardly through the driveway 21. The cover 34 is in the form of a sheath which is engageable over the guide 31, staples Y and spring biased follower 33 to house the said parts. The cover 34 may be secured to a head 36 on the outer terminal end of the guide 31, and is preferably a cylindrical or tubular part adapted to be used as a handle for manipulation of the gun by the hands of the user. Fastening means, such as a pin and J-slot, may be provided to secure the cover 34 in working position.

With the structure thus far described it will be readily seen that U-shaped staples Y are handled and delivered one at a time to be driven from the lower end of the body 20 of the gun. The necessary force for driving the staples Y may be supplied by compressed air as hereinafter described, which acts to drive the piston 24 downwardly.

The clip feeding means E is provided to feed the clips X into proper and exact position relative to the staples Y to be secured by the staples to a support R as clearly shown in Fig. 4 of the drawings. The feeding means E involves, generally, a slide 40 shiftably carried in the passage 17 that extends through the frame A, a head 41 on the slide 40 and a clip retainer 42 projecting from the head.

The slide is shiftable lengthwise of the frame A and may be a substantially flat, elongate element having working clearance in the passage 17 so as to be operable between inner and outer positions. When in the inner position the forward end of the slide 40 enters the opening 18, as shown in Fig. 6 of the drawings, while in the outer position the forward end of the slide 40 is retracted and is out of the opening 18, as shown in Fig. 5 of the drawings.

The head 41 is carried on the forward end of the slide 40 and is preferably an enlargement of the slide 40 characterized by a flat clip engaging face 43. The face 43 is in a plane normal to the longitudinal axis of the frame A and is adapted to be engaged with the side of the clip X, preferably with the upstanding flange 11 thereof.

In accordance with the present invention, the opening 18 is elongate and not only receives the lower end of the body 20 but extends rearwardly therefrom to receive the clips X from or through the top 16 of the frame A. The clips X enter the opening 18 from the top 16 and are faced forwardly, that is, with the flange 11 toward the face 43 and with the bar 14 toward the staple handling structure above described. The face 43 is preferably equal in vertical extent to the flange 11. With the structure and the clip X thus related the clip feeding means E may be operated to advance the clip into position to be fastened or anchored by a fastener or staple Y.

With the clip related to the structure as above set forth, the retainer 42 that I have provided and which projects forward from the upper edge of the head 41, acts to hold the clip X securely while being fed in order to prevent turning of the clip, that is, the flange end of the clip X will not lift upwardly. In practice, the bottom 15 of the frame A is extended forwardly to underlie a portion of the opening 18 forming a plate 44 that receives each clip X as it enters the opening. Thus, the clip X is confined between the retainer 42 and plate 44 as it is fed. As shown, the plate 44 terminates at an edge 45 spaced rearwardly from the forward wall 46 of the opening 18, so that when the clip reaches the foremost position the forward end thereof seats against the end 46 of the opening. When the staple Y is applied to the clip X the clip is drawn up tightly against the support R and is pulled away from the lip 43.

The drive F for the feeding means E is preferably a powered means and, as shown, is a fluid means involving a cylinder 47, a piston 48 and a coupling 49. The cylinder 47 is carried by the frame A at the upper side 16 thereof and extends horizontally on an axis parallel to and spaced from the slide 40. The cylinder 47 has a head 50 closing the forward end thereof, and a head 51 closing the rear end thereof. The piston 48 is slidably carried in the cylinder 47 and is adapted to operate between the ends of the cylinder. The coupling 49 connects the piston 48 and slide 40 so that the slide is operated between the said inner and outer positions above referred to.

As shown, the means F involves a rod 52 that projects from the piston 48 through a gland 53 in the head 51, and an arm 54 that projects upwardly from the slide 40 to be engaged by the rod 52. The arm 54 is preferably integral with the slide 40 and projects upwardly from the rear end portion thereof, which end portion extends beyond the rear of the frame A. A spring 55 is carried on the rod 52 and acts between the head 51 and arm 54 to yieldingly urge the slide 40 to the outer or retracted position.

The clip supply or magazine G is provided to carry a substantial supply of clips X and is an elongate element carried alongside the staple handling structure above described. In the preferred form of the invention, the means G is substantially parallel with the axis of the staple handling structure and involves, generally, a chute 60 substantially square in cross section and open at the top and bottom ends thereof. The chute 60 is also open throughout its length along one side thereof for access to the clips Y carried therein, and has parallel side walls with suitable clearance for freely passing the clips X. In accordance with the present invention, the clips X are supplied in stacks 61 made up of a plurality of clips arranged one against the other in an elongate series. As shown, the stack 61 is vertically disposed with the lips 12 and bases 10 bearing one upon the other. The stacks 61 may be secured together by means of a suitable cement, for example, cellulose acetate cement or the like.

As illustrated, a spring biased follower 62 yieldingly urges the clips X downwardly in the chute 60, and a spring 63 carried on a stem 64 acts between a head 65 on the stem and the follower 62 to press against the uppermost clip X. The stem 64 passes through the openings 13 in the clips and may be used to carry the stacks of clips prior to being inserted into the chute 60 to be handled by the transporting means E above described. The upper end of the stem 64 is preferably provided with a lateral extension 66 engageable with the wall of the chute 60, for example, in a J-slot at 67.

In accordance with the present invention I have provided a clip engaging arm 68 that prevents turning of the clip. In addition to the retainer 42 above referred to, the arm 68 is provided and is a spring arm that yieldingly engages the top side of the clip bases 10. The retainer 42 holds the rear end of the clip down while the arm 68 holds the front of the clip down. The arm 68 is in the form of an elongate vertically disposed leaf spring 69 with a shoe portion 70 at the lower end thereof engageable with the base 10 of the clip to yieldingly hold it in pressure engagement with the plate 44 (Fig. 5) until the clip X is moved forwardly and downwardly over the edge 45 of the plate 44, whereupon the clip X is urged into pressure engagement with the support R (Fig. 6) when the staple Y is driven.

The control H for the staple driving means C and drive F for the clip feeding means E is a fluid controlling means adapted to release a charge of air to the means C and drive F. In practice, the gun of the present invention may be pneumatically powered, in which case the cylinders 23 and 47 are air cylinders operable by means of compressed air. Compressed air is supplied to the gun by a hose 75 through a suitable fitting or connection 76 on the head 27. A suitable release valve 77 is carried within the head 27 and is controlled by means of a manually operable trigger 78 engaged with the stem 79 of the valve. The valve 77 acts to admit air from the hose 75 to the cylinders 23 and 47 when the trigger 78 is operated (Fig. 11) and acts to exhaust air from the cylinders when it is released. The valve discharges air directly into the cylinder 23 and is connected to the cylinder 47 which is remote therefrom by means of an air line 80. The cylinder 23 is of substantial length whereas the cylinder 47 is substantially short in length so that the piston in the cylinder 47 moves to position the clip X beneath a staple before the piston in the cylinder 23 reaches the position where it acts to drive the staple Y onto the clip X. Therefore, the action of the two cylinder and piston means is coordinated to insure proper fastening of the clip X onto the support R by the staple Y.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A clip applying gun of the character described including, a frame, a fastener driveway means carried by the frame, a clip magazine carried by the frame adjacent the driveway means, a clip feeding means adapted to receive clips from the magazine and to move the clips into a position beneath the fastener driveway, and a fluid actuated control for synchronously operating both of said means and comprising, a substantially elongate cylinder and piston drive for delivering the fasteners through the driveway, a substantially short cylinder and piston drive for operating the clip feeding means and delivering the clips from the magazine, and a single fluid valve for simultaneously charging both of said cylinder and piston drives, whereby the substantially short drive moves the clips into position for application after which the substantially elongate drive moves the fasteners into position over the clips.

2. A clip applying gun of the character described including, a frame, a fastener driveway means carried by the frame, a clip magazine carried by the frame adjacent the driveway means, a clip feeding means adapted to receive clips from the magazine and to move the clips into a position beneath the fastener driveway, and a fluid actuated control for synchronously operating both of said means and comprising, a substantially elongate cylinder and piston drive and return means therefor and for delivering the fasteners through the driveway, a substantially short cylinder and piston drive and return means therefor and for operating the clip feeding means and delivering the clips from the magazine, and a single fluid valve for simultaneously charging and exhausting both of said cylinder and piston drives, whereby the substantially short drive moves the clips into position for application after which the substantially elongate drive moves the fasteners into position over the clips.

3. A clip applying gun of the character described including, a frame, a fastener driveway means carried by the frame, a clip magazine carried by the frame adjacent the driveway means, a clip feeding means adapted to receive clips from the magazine and to move the clips into a position beneath the fastener driveway, and a fluid actuated control for synchronously operating both of said means and comprising, a substantially elongate cylinder and piston drive and spring return means therefor and for delivering the fasteners through the driveway, a substantially short cylinder and piston drive and spring return means therefor and for operating the clip feeding means and delivering the clips from the magazine, and a single fluid valve for simultaneously charging and exhausting both of said cylinder and piston drives, whereby the substantially short drive moves the clips into position for application after which the substantially elongate drive moves the fasteners into position over the clips.

4. A gun for applying a clip having a base with an opening therethrough and an upstanding flange at one side thereof, including, an elongate frame with a passage extending longitudinally therethrough and with an opening passing therethrough from one side to the other and intersecting the passage, a fastener driveway means carried by the frame and entering the opening at one side of the frame, a clip magazine having a chute carried by the frame and entering the passage at said side of the frame adjacent the fastener driveway means, a clip feeding means including a slide shiftably carried in the frame and with a face engageable with the side of the clip and with a retainer engageable with the top of the clip, said face being engageable with the flange to move the clip through said passage and into a position in said opening in the frame and said retainer being engageable over the flange and placing the opening in the clip beneath the fastener driveway means, and a control for operating both said means whereby the clip and fastener are delivered from the opening at the other side of the frame.

5. A gun for applying a clip to a work piece and having a base and an upstanding flange at one side thereof, including, an elongate frame with a passage and an opening passing through the frame from one side to the other and intersecting the passage, a fastener driveway means carried by the frame and entering the opening at one side of the frame, a clip magazine having a chute carried by the frame and entering the passage at said side of the frame adjacent the fastener driveway means, a clip feeding means including a slide shiftably carried in the frame and with a face operable into the passage and engageable with the side of the clip, said face being engageable with the flange to move the clip through the passage into a position in the opening and beneath the fastener driveway means, an arm yieldingly engageable with the clip to guide the base thereof through said passage and to urge the flange thereof into pressured engagement with the face of the slide, and a control for operating both said means whereby the clip and fastener are delivered from the opening at the other side of the frame.

6. A gun for applying a clip to a work piece and having a base with an upstanding flange at one side thereof and an opening therethrough including, an elongate frame with a passage extending longitudinally therethrough and with an opening passing therethrough from one side to the other and intersecting the passage, a fastener driveway means carried by and projecting from the frame and entering the opening at one side of the frame, means for driving said fasteners, a fastener magazine for delivering fasteners into the driveway means, a clip magazine carried by the frame and entering the passage at said side of the frame adjacent the fastener driveway means, a clip feeding means including a slide shiftably carried in the frame and with a face engageable with the side of the clip and with a retainer engageable with the top of the clip, said face being engageable with the flange to move the clip through said passage and into a position in said opening in the frame and said retainer being engageable over the flange and placing the opening in the clip beneath the fastener driveway means, an arm yieldingly engageable with the clip to guide the base thereof through the said passage and to urge the flange thereof into pressured engagement with the face of the slide, and a control for operating the means for driving said fasteners and for operating the clip feeding means whereby the clip and fastener are delivered from the opening at the other side of the frame.

References Cited in the file of this patent

UNITED STATES PATENTS

| Number | Name | Date |
|---|---|---|
| 454,199 | Arnold | June 16, 1891 |
| 512,383 | Mandel | Jan. 9, 1894 |
| 643,937 | Boggs | Feb. 20, 1900 |
| 1,112,704 | Keller | Oct. 6, 1914 |
| 1,387,530 | Wolfeld | Aug. 16, 1921 |

FOREIGN PATENTS

| Number | Country | Date |
|---|---|---|
| 16,409 | Great Britain of 1893 | Nov. 11, 1893 |